United States Patent Office 3,509,712
Patented May 5, 1970

3,509,712
PHOTOELECTRIC CONVERSION SYSTEM IN A
HOROLOGICAL DEVICE
Theodore S. Grohoski, Woodbury, Conn., assignor to
Timex Corporation, a corporation of Delaware
Filed June 22, 1966, Ser. No. 559,489
Int. Cl. G04c 3/00
U.S. Cl. 58—23                    7 Claims The present invention relates to a photoelectric conversion system and more particularly to a device and circuit for charging a battery from a source of light and for controlling the output of a solar cell.

Semi-conductive solar cells have been available for some years. These cells convert light (actinic) energy into electrical energy. They are sometimes used to charge electrical storage batteries. Such cells include a specially produced semi-conductive body, usually of silicon, having a p-n junction.

When a solar cell is used out of doors or in other locations in which the amount of light reaching the cell varies from darkness to brightness, the cells may be constructed so that they are not adversely affected by bright light. However, the electrical current output of the cell is directly proportional to the amount of light reaching its surface. If too much light reaches the cell, its electrical current output may rise to a sufficiently high level to injure the component to which it is connected, such as a storage battery.

There have been a number of circuits proposed to avoid the problem of overcharging the battery with too high a rate of current. A widely used measure is to provide a current regulator, such as a semi-conductive Zener diode, in parallel with the battery. The regulator prevents an excess current from reaching the battery.

Another solution is to make the area of the solar cell so small that even in the brightest light its current output will not exceed the capacity of its connected load. However, this measure necessarily means that in subdued light there may not be sufficient power produced by the cell to operate the load, for example, to keep the battery charged.

It is the objective of the present invention to provide a solar cell device for charging a battery which is automatically limited so that its charge does not exceed the charging capacity of the battery. It is a further objective that the device be compact, not subject to mechanical or electrical breakdown, and relatively inexpensive.

In accordance with the present invention, a phototropic (photochromic) material is placed over the light sensitive surface of the solar cell. The phototropic material darkens in proportion to the amount of light incident upon it. As the amount of incident light increases, the phototropic material becomes darker and permits the passage of a decreasing percentage of the incident light through the material. In this way the amount of light reaching the solar cell is limited to a relatively constant level or a level below some predetermined maximum level. Since the quantity of light reaching the cell is limited, the cell's electrical output is also limited to a level below the current which would injure the battery.

Other objectives of the present invention will be apparent from the description of the preferred embodiment of the invention given below, which is taken in conjunction with the accompanying drawings, in which.

Figure 1:
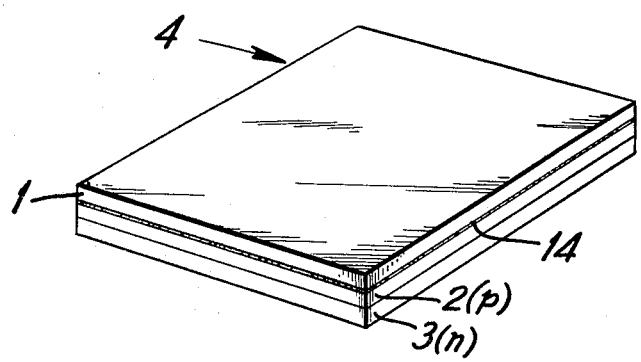
FIG. 1 is a perspective view of the improved solar cell of the present invention.

In FIG. 1 the conventional semi-conductive solar cell is shown as consisting of p-layer 2 and n-layer 3. The term p refers to the conduction primarily by holes which occur in that semi-conductive layer. In the n-type layer 3 the conduction is mainly by electrons. The semi-conductive body, preferably of highly refined silicon, is doped with impurities to provide an excess or deficit of valence electrons which may be displaced by light (actinic radiation). The boundary between the p- and n-layers, i.e., the junction of layers 2 and 3, is a rectifying junction known as a p-n junction. Preferably the p-layer 2 is formed by the vapor diffusion of an electron acceptor impurity such as boron into the n-layer to form the extremely thin p-type layer 2. Layer 2 is sufficiently thin (about the diffusion length of the minority carriers) so that it is effectively transparent to incident light. The term "solar cell," as used herein, refers broadly to all types of semi-conductive devices for converting actinic energy into electrical energy.

The solar cell is covered by a layer of phototropic material 1. Preferably layer 1 is joined to the other layers by a clear transparent thermosetting resin 14. Layer 1 darkens in proportion to the amount of light per unit volume impinging upon it. That is, its transmittal of light is inversely proportional to the intensity of light upon it. A suitable phototropic material is an amorphous silicate glass having a concentration of between .01 and .1, by volume, of light sensitive crystals. Suitable crystals are silver chloride, silver bromide and silver iodide crystals of less than 100 angstroms in diameter. The crystals are added to the glass when it is molten and the glass is cooled slowly. Further details of such glasses are obtainable from U.S. Pats. 3,208,860 and 3,197,296, among other publications.

Preferably the spectral response of the solar cell is matched to the spectral response of the phototropic layer 1. For example, "Bestlite" photochromic glass, manufactured by Corning Glass, absorbs ultraviolet rays below 330 millimicrons, is darkened by near ultraviolet, and transmits throughout the remainder of the visible spectrum, i.e., transmittal of about 90 percent for visible light above 450 millimicrons. It is darkened primarily by near ultraviolet. This glass is preferably used with a solar cell which produces electricity primarily in response to near ultraviolet radiation.

Figure 2:
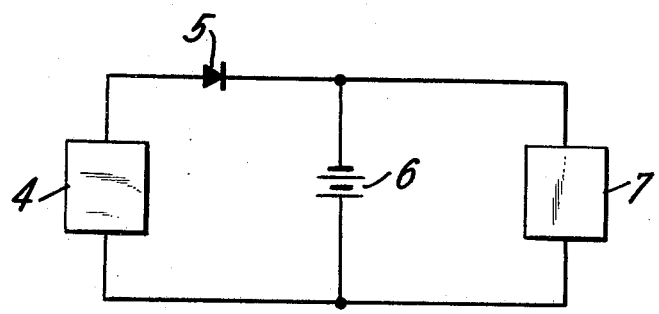
FIG. 2 is a circuit diagram in block form of the circuit used in the present invention.

In FIG. 2 the solar cell with its phototropic cover is shown as cell 4. It is connected to a semi-conductive diode 5. A rechargeable (secondary) battery 6 is in parallel with the series combination of the diode 5 and the solar cell 4. The function of diode 5 is to prevent the cell 4 from draining the battery 6 during dark periods. The solar cell 4, during darkness, acts as a passive load with low impedance.

The load 7 is placed in parallel with the solar cell 4 and the battery 5. Typical loads are small motors, lights, warning horns and electronic equipments such as amplifiers.

The battery 6 is preferably of the nickel-cadmium type. The electrodes are, initially, cadmium oxide or cadmium hydroxide and nickel. The electrolyte is an alkaline liquid. In the "Durac" type of nickel-cadmium battery the electrodes are of nickel carbonyl impregnated with nickel and cadmium salts. Nickel-cadmium batteries are damaged by too high a rate of charging. In the case of a single cell miniature battery having a rated capacity of 20 milliampere hours, a charging rate in excess of 2 milliamperes per hour would be excessive and may damage the battery. For example, in the nickel-cadmium battery "Eveready" N 22, a button cell manufactured by Union Carbide, the ten-hour rate is 2 milliamperes and the maximum recommended charge is also 2 milliamperes. If the recommended rate of charge is exceeded, oxygen may be evolved at the nickel electrode faster than it can be reacted at the cadmium electrode and sufficient pressure may develop to rupture the cell.

An alternative secondary battery is the silver oxide type. This type uses zinc and silver oxide as the electrodes and potassium hydroxide and zinc hydroxides as the electrolyte. The charging of this type of cell should be by constant current. Vinyl, in his book Storage Batteries, at page 101 states, in regard to silver oxide batteries, "Charging may be done also by the modified constant-potential method from a D-C source of 2.2 to 2.5 volts with a series resistance in the circuit to limit the initial current to that corresponding to the 1-hour rate."

The phototropic layer 1 limits the rate of charging the battery 6; however, it does not protect the battery from overcharging due to an over-accumulation of charge over time.

Figure 3:
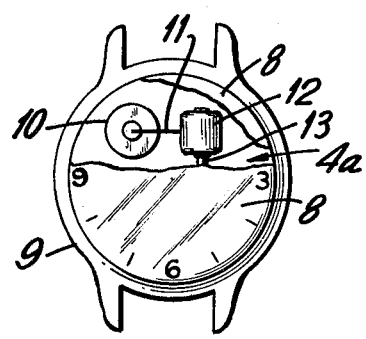
FIG. 3 is a top plan view of a watch with its dial partly broken away to show its internal mechanism.

In the specific embodiment of a watch as shown in FIG. 3, the solar cell 4a, which is the cell of the present invention as shown in FIG. 1, is the dial plate of the watch. It is protected from the atmosphere by the watch crystal 8. Alternatively, the dial is an uncovered solar cell, i.e., consisting of p-layer 2 and n-layer 3, and the watch crystal 8 is of a phototropic glass. The crystal is mounted in a bezel 9. Wires from the solar cell 4a lead to a rechargeable miniature battery 10. The wire 11 from the battery leads to a miniature electric motor 12 whose output shaft 13 drives the gear mechanism of the watch. A suitable circuit for driving a motor in a watch and a suitable motor is shown in U.S. Pat. 3,046,460, to Zemla, issued July 24, 1962.

I claim:

1. A horological device comprising a case, a base plate within the case, gear train means pivotally mounted on the plate, a plurality of hands attached to the gear train, motor means mounted on the plate to drive the gear train, a solar cell for converting actinic energy into electrical energy mounted within the case, a storage battery positioned on the plate and connected to said solar cell and said motor means, and a layer of phototropic material positioned in the case over said solar cell.

2. A horological device as set forth in claim 1, further comprising a diode in series with said solar cell.

3. A horological device as set forth in claim 1, in which said phototropic material includes means which darkens in direct proportion to the amount of incident actinic energy for providing a constant amount of actinic energy to said solar cell, thereby resulting in a substantially constant charging current to said rechargeable battery.

4. A horological device as set forth in claim 1, wherein said phototropic material is characterized by a spectral response which conforms to the spectral response of said solar cell.

5. A horological device as set forth in claim 1, in which said solar cell is composed of a semi-conductor material having a p-n junction.

6. A horological device as set forth in claim 1 and also including a crystal mounted on the said case, and in which the solar cell is a dial plate.

7. A horological device as set forth in claim 1 in which the phototropic layer is the crystal of the device.

References Cited

UNITED STATES PATENTS 3,304,433　2/1967　Hamann _____ 250—227

RICHARD B. WILKINSON, Primary Examiner

E. C. SIMMONS, Assistant Examiner

U.S. Cl. X.R.

250—212